# 2,975,156

NOVEL MONOMERIC COMPOUNDS AND HOMOPOLYMERS AND INTERPOLYMERS THEREOF

Frank Fekete, Tonawanda, N.Y., assignor to Pittsburgh Plate Glass Company, Allegheny County, Pa., a corporation of Pennsylvania No Drawing. Filed Mar. 21, 1956, Ser. No. 572,795

13 Claims. (Cl. 260—67)

This invention relates to novel monomers and interpolymers, and pertains more specifically to monomers obtained by the reaction of diallylidene pentaerythritol with unsaturated monocarboxylic acids, and to interpolymers of such novel monomers with other polymerizable monomeric compounds.

It is known that pentaerythritol reacts with acrolein in the presence of an acidic catalyst and under reflux conditions to give diallylidene pentaerythritol, which possesses the following structure:

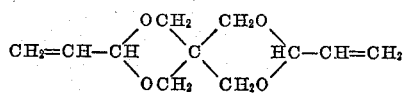

One such reaction is disclosed in Angewante Chemie, volume 62, pages 105–118 (1950).

It has now been discovered that diallylidene pentaerythritol will react with unsaturated monocarboxylic acids, and particularly acrylic acid and methacrylic acid, in the presence of an acidic catalyst, to give novel monomeric compounds substantially in accordance with the following equation:

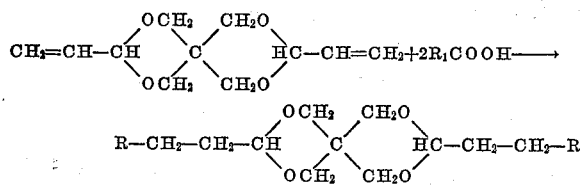

In the foregoing equation $R_1$ represents an alkenyl radical and each R represents the radical derived by removing a carboxyl hydrogen atom from an unsaturated monocarboxylic acid, that is, an acyloxy radical. For example, when methacrylic acid is utilized in the reaction, di(beta-methacrylyloxy-propionaldehyde)-pentaerythritolacetal, having the following structure is obtained:

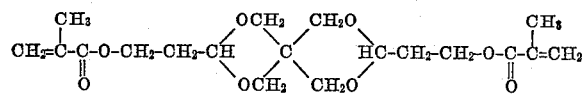

The compound depicted structurally above, as well as other monomers obtained by the process of this invention, polymerize very readily in the presence of conventional polymerization catalysts, such as the peroxygen compounds or the diazo compounds, to give hard, clear, thermoset homopolymers, or polymerize with one or more other ethylenically unsaturated monomeric compounds to form useful interpolymers having many valuable properties, including excellent optical properties and hardness.

Any unsaturated monocarboxylic acid may be reacted with diallylidene pentaerythritol in accordance with the reaction set forth hereinabove. As indicated, acrylic acid and methacrylic acid are particularly preferred, primarily because they both are readily available at relatively low cost. However, other unsaturated monocarboxylic acids may also be utilized, such acids including crotonic acid, oleic acid, and the like.

The reaction of diallylidene pentaerythritol with unsaturated monocarboxylic acids in accordance with this invention can readily be effected simply by heating a mixture of the reactants. Preferably, however, the reaction is carried out in the presence of an acidic catalyst such as para-toluenesulfonic acid, oxalic acid, sulfuric acid, maleic acid, or the like. The reaction is generally carried out at temperatures of about 50° C. to 100° C., in which case the reaction is substantially complete in about 6 to 8 hours. Alternatively, however, temperatures as low as room temperature, or lower, or as high as 150° C. or higher, may be employed, although the reaction may require a longer period of time when low temperatures are employed, and substantial polymerization may take place when very high temperatures are used.

As indicated hereinabove, two moles of the unsaturated monocarboxylic acid are required stoichiometrically to react with one mole of the diallylidene pentaerythritol. It will be noted, however, that the diallylidene pentaerythritol has two reactive positions, namely, the two allyl double bonds, so that some quantity of the mono-substituted compound may be obtained, although the di-substituted compound is the major product. The reaction may also be carried out utilizing less than two moles of acid per mole of the diallylidene pentaerythritol, or by utilizing a large excess of the acid, although no particular advantage is obtained when other than substantially stoichiometric quantities are employed.

The quantity of acid catalyst utilized, if any, may also be varied widely; in general, however, it is desired to employ from about 0.1 percent to about 1.0 percent by weight of the catalyst based on the total weight of the diallylidene pentaerythritol and unsaturated monocarboxylic acid. Amounts of catalysts smaller than 0.1 percent or larger than 1.0 percent, for example, as high as 3.0 percent or higher may be utilized if desired.

Recovery of the desired product from the reaction mixture presents no particular problems. One convenient method involves adding toluene to the reaction mixture and washing the resultant mixture with water to remove any unreacted unsaturated acid. Two layers are formed, the product remaining in the toluene layer. This layer may sometimes be quite dark, but can easily be clarified by washing with sodium hydrosulfite. The toluene is removed by evaporation, and the remaining product filtered to remove any foreign particles therefrom. The product is generally in the form of a light brown liquid. Other conventional means for recovering the product from the reaction mixture may also be used.

The monomeric compounds obtained by this process polymerize readily in the presence of a small quantity of a catalyst and in the presence of heat to give polymers which are hard, clear and strong. In like manner, these monomers can be admixed with other monomeric materials in the presence of catalysts and heater to give interpolymers which are also hard, clear and strong. The polymerization takes place very rapidly, being substantially complete in as little as 5 or 10 minutes. This fact demonstrates the tremendous advantage of having unsaturated end groups derived from unsaturated monocarboxylic acids attached to the pentaerythritol nucleus, rather than the allyl groups of the diallylidene pentaerythritol. The latter allyl groups polymerize, but only with difficulty and after periods as long as 20 hours to give not a hard product, but merely a viscous oil.

Among the monomers which can be polymerized with compounds such as di-beta-methacrylyloxypropionaldehyde-pentaerythritolacetal, and similar monomers obtained by the reaction of this invention, are the following: methyl acrylate, ethyl acrylate, butyl acrylate, isobutyl acrylate, hexyl acrylate, octyl acrylate, styrene, vinyl toluene, diallyl itaconate, maleate esters such as dibutyl maleate, acidic materials such as acrylic acid, methacrylic acid, maleic anhydride, vinyl ethers, vinyl ketones, vinyl pyridines, allyl acetoacetates, glycidyl acrylates, methacrylamide, dimethylbenzyl methacrylate, durenediol dimethacrylate, diallylidene pentaerythritol, and the like.

Among the catalysts which may be utilized to prepare either the homopolymers or interpolymers of monomers of the structure

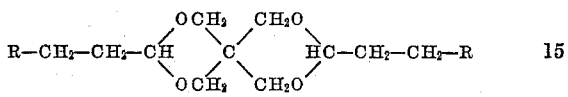

are the following: acetyl benzoyl peroxide, hydroxyheptyl peroxide, benzoyl peroxide, methyl ethyl ketone peroxide, cyclohexanone peroxide, cyclohexyl hydroperoxide, 2,4 - dichlorobenzoyl peroxide, t-butyl hydroperoxide, methyl amyl ketone peroxide, acetyl peroxide, lauroyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. The diazo compounds, such as p-methoxyphenyl diazo-thio-2(-naphthyl) ether may also be used as polymerization catalysts, as may actinic light. Redox catalyst systems can also be employed.

The quantity of catalyst employed can be varied considerably; however, in most instances it is desirable to utilize from about 0.1 percent to 2.0 percent based on the total monomer weights.

The polymerization can be carried out in mass, that is, simply by heating the monomer or monomers in the presence of a catalyst, or if desired, the polymerization can be conducted in a solvent for the monomer or monomers, or in an aqueous emulsion. Chain modifying agents or chain terminators such as the mercaptans, and particularly dodecyl mercaptan, and other additives conventionally utilized in polymerization reactions, can be employed.

The following examples illustrate in detail the preparation of novel monomers by the reaction of diallylidene pentaerythritol with unsaturated acids, and the polymerization of such monomers to form homopolymers and interpolymers. The examples are not intended to limit the invention, however, for there are, of course, numerous possible variations and modifications.

*Example I*

A mixture of 62 grams of diallylidene pentaerythritol, 52 grams of methacrylic acid, and 0.06 gram of para-toluene-sulfonic acid was heated in a flask fitted with a stirrer, condenser and thermometer. The mixture was heated at a temperature of from 60° C. to 80° C. for nearly 8 hours, the mixture becoming slightly brown, probably due to the presence of the catalyst. The reaction mixture was then washed with water to remove unreacted methacrylic acid. Toluene was added whereupon two layers formed, the product remaining in the toluene layer which was separated and treated with sodium hydrosulfite to remove the dark color. The toluene was removed by evaporation and the remaining product filtered through an activated silica-charcoal layer to remove haziness and foreign particles. The final monomer was light brown in color and was found to be di-beta-methacrylyloxy - propionaldehyde - pentaerythritolacetal having the structure

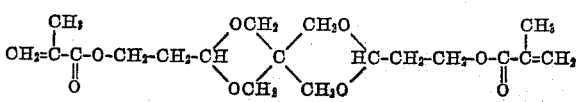

*Example II*

Example I was repeated substituting acrylic acid for the methacrylic acid. Di-beta - acrylyloxypropionaldehyde-pentaerythritolacetal was obtained in good yield.

*Example III*

Ten grams of the product of Example I was heated together with one-tenth gram benzoyl peroxide at a temperature of 100° C. The di-beta-methacrylyloxypropionaldehyde-pentaerythritolacetal polymerized in less than 10 minutes. The polymer was a thermoplastic-like material while warm, but thermoset on cooling to give a hard, clear polymer which could be used as a plastic for glazing purposes and for similar uses.

*Example IV*

Five grams of the product of Example I and 5 grams of alpha, alpha'-durenediol dimethacrylate, prepared according to the method disclosed in copending application, Serial No. 557,431, filed January 5, 1956, were heated in the presence of one-tenth gram of benzoyl peroxide for 5 minutes at 100° C. A thermosetting clear product was obtained. The product forms useful clear, cast sheets.

*Example V*

Example IV is repeated substituting methyl methacrylate, styrene, acrylonitrile and vinyl toluene respectively for the alpha, alpha'-durenediol dimethacrylate. In each instance, a hard polymeric material is obtained. The polymer can be dissolved in solvents to form coatings, or may be used in the form of cast sheets. Moreover, by substituting still other monomeric materials such as those disclosed hereinabove, it is possible to obtain other useful modifications of the polymers of these examples.

While specific examples of the invention have been set forth hereinabove, it is not intended to limit the invention solely thereto, but to include all of the variations and modifications thereof which are within the scope of the appended claims.

I claim:

1. A compound of the structure

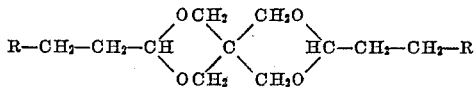

wherein each R represents the radical derived by removing the carboxyl hydrogen atom from an aliphatic monoethylenically unsaturated monocarboxylic acid containing from 3 to 18 carbon atoms.

2. The compound of claim 1 wherein the radical R represents a methacrylyloxy radical.

3. The compound of claim 1 wherein the radical R represents an acrylyloxy radical.

4. An interpolymer of a compound of the structure

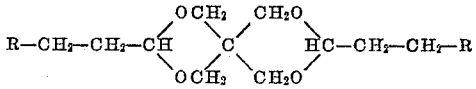

wherein R represents the radical derived by removing a carboxyl hydrogen atom from an aliphatic monoethylenically unsaturated monocarboxylic acid containing from 3 to 18 carbon atoms, and at least one other polymerizable monomeric compound containing a terminal $CH_2=C<$ group, said interpolymer being formed in the presence of a catalyst that causes polymerization through the ethylenic groups present in the monomeric components.

5. The interpolymer of claim 4 wherein the radical R represents a methacrylyloxy radical.

6. A copolymer of di-beta-methacrylyloxypropionaldehyde-pentaerythritolacetal having the structure

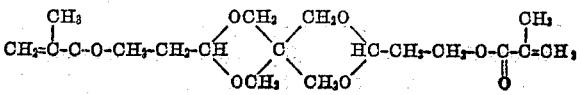

and alpha, alpha'-durenediol dimethacrylate, said copolymer being formed in the presence of a catalyst that causes polymerization through the ethylenic groups of the monomeric components.

7. A homopolymer of the compound of claim 1, said homopolymer being formed in the presence of a catalyst that causes polymerization through the ethylenic groups of said compound.

8. A homopolymer of the compound of claim 2, said homopolymer being formed in the presence of a catalyst that causes polymerization through the ethylenic groups of said compound.

9. The method of preparing a compound of the structure

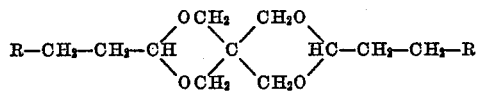

wherein each R represents the radical derived by removing the carboxyl hydrogen atom from an aliphatic monoethylenically unsaturated monocarboxylic acid containing from 3 to 18 carbon atoms, which comprises reacting diallylidene pentaerythritol with an aliphatic monoethylenically unsaturated monocarboxylic acid containing from 3 to 18 carbon atoms in the presence of an acidic catalyst selected from the class consisting of paratoluenesulfonic acid, mineral acids, and carboxylic acids.

10. The method of claim 9 wherein each radical R represents a methacrylyloxy radical.

11. The method of claim 9 wherein each radical R represents an acrylyloxy radical.

12. The method which comprises reacting diallylidene pentaerythritol with methacrylic acid in the presence of paratoluenesulfonic acid and at a temperature of about 60° C. to 80° C., whereupon chemical reaction occurs to form as the predominant product, di-beta-methacrylyloxy-propionaldehyde-pentaerythritolacetal having the structure

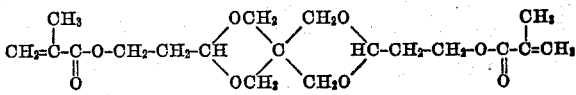

13. A compound of the formula

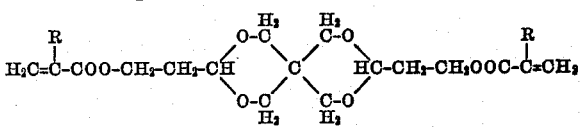

wherein R is a member selected from the group consisting of H and methyl.

References Cited in the file of this patent
UNITED STATES PATENTS
2,680,735    Fegley et al. _____ June 8, 1954

FOREIGN PATENTS
868,351    Germany _____ Feb. 23, 1953
695,633    Great Britain _____ Aug. 12, 1953